T. HYATT.

Assignor to E. A. L. HYATT.

Illuminating Doors for Inclosing Vaults, Areas, Cellar-Ways, &c.

No. 8,307. Reissued June 25, 1878.

WITNESSES:

Jas. E. Hutchinson.

Henry C. Hazard.

INVENTOR.

Thaddeus Hyatt, by

Prindle & Co., his Attys.

N. PETERS, PHOTO-LITHOGRAPHER, WASHINGTON, D. C.

UNITED STATES PATENT OFFICE.

THADDEUS HYATT, OF NEW YORK, N. Y., ASSIGNOR TO ELIZABETH A. L. HYATT.

IMPROVEMENT IN ILLUMINATING-DOORS FOR INCLOSING VAULTS, AREAS, CELLAR-WAYS, &c.

Specification forming part of Letters Patent No. 145,183, dated December 2, 1873; Reissue No. 8,307, dated June 25, 1878; application filed June 10, 1878.

*To all whom it may concern:*

Be it known that I, THADDEUS HYATT, of New York, in the county of New York, and in the State of New York, did invent certain new and useful Improvements in Illuminating-Doors, for which Letters Patent No. 145,183 were issued to me upon the 2d day of December, 1873, which Letters Patent have been found defective in that the specification and claims do not cover and embrace all of the original invention, as set forth in the original application filed in the Patent Office on the 22d day of October, 1873.

Now, therefore, being desirous of reissuing said Letters Patent, herewith surrendered, I have prepared and do hereby declare that the following is a full, clear, and exact description of the said invention, reference being had to the accompanying drawing, making a part of this specification, in which—

Figure 1:
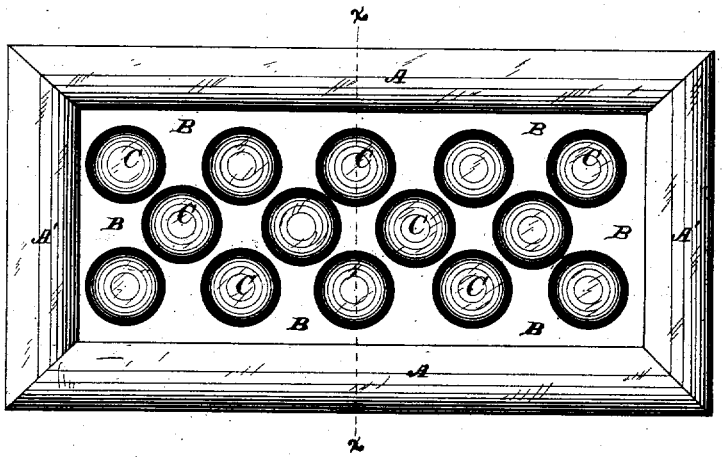
Figure 2:
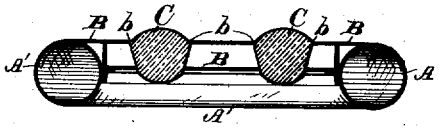

Figure 1 is a plan view of the upper side of a door constructed in accordance with my improved method. Fig. 2 is a transverse section of the same upon line *x x* of Fig. 1.

Letters of like name and kind refer to like parts in each of the figures.

Illuminating-doors for inclosing areas, cellar-ways, &c., have heretofore been constructed from cast-iron, and in order that the glasses might be properly set and the necessary strength might be insured such thickness of metal has been necessary as to render the doors so heavy that they were opened or closed with difficulty, and to handle them required such strength as is usually possessed by none but men. In consequence of their great weight and of the nature of the material from which said doors were constructed a fall was certain to injure or break some portion, which reason, added to those before named, has prevented the use of illuminating-doors from becoming as general as would otherwise have been the case, and caused those constructed from thin plates of wrought-iron and having no illuminating glazed openings to be substituted for them.

To obviate these difficulties and enable the construction of an illuminating-door which shall possess all necessary strength, and yet have such weight as to be easily and readily handled, is the design of my invention, which consists, as a new article of manufacture, in an illuminating-door composed of wrought-iron with glazed light-openings, substantially as and for the purpose hereinafter specified.

It will be readily seen that the principle involved in the construction of my door is capable of application in many different ways; but for convenience I will describe but two.

In the annexed drawing, A and A represent the sides, and A′ and A′ the ends, of my door-frame, constructed of or from round tubing or other equivalent stiffener, which, at their intersecting ends, are united by any suitable means that will form a strong durable joint. Within the frame thus constructed is placed a sheet-metal panel, B, which is preferably composed of two sheets, that are so united as to leave an air-space between their inner faces. A number of light-openings, *b*, are formed in and through the hollow panel, and within each of such openings is secured, in any usual manner, an illuminating-lens, C, that has any desired size or shape.

The door thus constructed wholly from thin or sheet metal possesses in a great degree strength and rigidity, while its weight is materially less than that of ordinary doors, and its cost is no more than in case of doors constructed wholly from cast-iron.

Having thus fully set forth the nature and merits of my invention, what I claim is—

As a new article of manufacture, an illuminating-door composed of wrought-iron with glazed light-openings, substantially as and for the purpose specified.

In testimony that I claim the foregoing I have hereunto set my hand this 29th day of May, A. D. 1878.

THADDEUS HYATT.

Witnesses:
GEO. S. PRINDLE,
HENRY C. HAZARD.